US010075032B2

(12) United States Patent
Popov

(10) Patent No.: US 10,075,032 B2
(45) Date of Patent: Sep. 11, 2018

(54) BRUSHLESS ALTERNATOR WITH CLAW POLES

(71) Applicant: ALMOTT, Ltd, Stara Zagora (BG)

(72) Inventor: Encho Nokolov Popov, Sofia (BG)

(73) Assignee: ALMOTT, Ltd., Stara Zagora (BG)

( * ) Notice: Subject to any disclaimer, the term of this patent is extended or adjusted under 35 U.S.C. 154(b) by 296 days.

(21) Appl. No.: 14/895,080

(22) PCT Filed: Sep. 12, 2014

(86) PCT No.: PCT/BG2014/000033
§ 371 (c)(1),
(2) Date: Dec. 1, 2015

(87) PCT Pub. No.: WO2016/037243
PCT Pub. Date: Mar. 17, 2016

(65) Prior Publication Data
US 2016/0294233 A1    Oct. 6, 2016

(30) Foreign Application Priority Data

Sep. 12, 2014  (BG) .......................... 111823

(51) Int. Cl.
*H02K 1/22* (2006.01)
*H02K 1/24* (2006.01)
(Continued)

(52) U.S. Cl.
CPC .............. *H02K 1/243* (2013.01); *H02K 9/02* (2013.01); *H02K 16/02* (2013.01); *H02K 19/24* (2013.01)

(58) Field of Classification Search
CPC ............. H02K 1/243; H02K 9/02; H02K 1/22
(Continued)

(56) References Cited

U.S. PATENT DOCUMENTS 4,286,186 A    8/1981   Hagenlocher et al.
4,882,515 A *  11/1989  Radomski .............. H02K 16/02
                                              310/168
(Continued)

FOREIGN PATENT DOCUMENTS

EP    2429063 A1    3/2012

OTHER PUBLICATIONS

International Search Report for international Application No. PCT/BG2014/000033 dated Aug. 9, 2015.

*Primary Examiner* — Hanh Nguyen
(74) *Attorney, Agent, or Firm* — Brown & Michaels, PC

(57) ABSTRACT

The alternator is used in the motor vehicles and provides increased current output. It comprises ring (17) and (17*a*) connecting the second claw poles (16) and (16*a*), and its peripheral surface which is opposite to the second claw poles (16) and (16*a*) is profiled and protruded outwards, shaped by the adjacent surfaces of inner and outer truncated cones whose axes coincide with the axis of the shaft. On the peripheries of external side plates (23) and (23*a*) at diameters equal to the inner diameters of the carried pole configurations and axes coinciding with the axis of the shaft (1) stationary are fixed second magnetoconductive rings (26) and (26*a*) whose surfaces located on the side of the first magnetoconductive rings (17), (17*a*) are shaped like a groove whose shape corresponds to the shape of the profiled protruded outwards peripheral surface of the first magnetoconductive rings (17), (17*a*) comprising them with possibility for their free rotation in the corresponding groove.

3 Claims, 5 Drawing Sheets

(51) Int. Cl.
*H02K 19/24* (2006.01)
*H02K 9/02* (2006.01)
*H02K 16/02* (2006.01)

(58) Field of Classification Search
USPC .......................................... 310/263
See application file for complete search history.

(56) References Cited

U.S. PATENT DOCUMENTS

| | | | | |
|---|---|---|---|---|
| 5,270,604 | A * | 12/1993 | Sandel | H02K 1/243 |
| | | | | 310/194 |
| 6,400,060 | B1 * | 6/2002 | Pfleuger | H02K 1/243 |
| | | | | 310/263 |
| 6,433,457 | B1 | 8/2002 | Nakamura | |
| 6,437,477 | B1 * | 8/2002 | Krefta | H02K 21/044 |
| | | | | 310/156.66 |
| 7,915,783 | B2 | 3/2011 | Popov | |
| 8,987,967 | B2 * | 3/2015 | Cai | H02K 21/044 |
| | | | | 310/156.66 |
| 2011/0241471 | A1 * | 10/2011 | Tokizawa | H02K 1/243 |
| | | | | 310/185 |

* cited by examiner

BRUSHLESS ALTERNATOR WITH CLAW POLES

FIELD OF THE INVENTION

The present invention relates to brushless alternator with claw pole rotor designed for operation as generator with regulated voltage for re-charging accumulator batteries in the motor vehicles and others.

DESCRIPTION OF PRIOR ART

A brushless alternator with claw poles is known [1,2] including drive shaft supported on front and rear bearings in front and rear end bells whereon outside the front end bell an exhaust fan is assembled. Between the front and rear end bells is fastened a housing enveloping fixedly stator which consists of stator pack with formed on its inner surface multitude of slots on even distribution wherein more than one phase windings are laid consisting of three or more phases. The phase winding terminals are connected to rectifiers. The rectifiers are covered by cap assembled on the rear end bell. On the drive shaft under the stator surface stationary are fit front rotor module and identical mirror located towards it rear rotor module. Each of the rotor modules consists of carrying and carried claw pole configurations. The carrying configuration of each rotor module includes carrying magnetoconductive disk with even spaced on its periphery claw poles and the carried pole configuration of each rotor module includes even spaced second claw poles connected by magneto-conductive ring. The second claw poles of both rotor modules are connected immovably by corresponding non-magnetic ring with the first claw poles. Each of rotor modules includes exciter in form of reel composed by internal and external side plates connected with cylindrical body forming a groove where excitation coil is placed. The external side plates are connected respectively to the front and rear end bell. The internal side plates are limited: by cylinder which axis coincides with the axis of the shaft, by convex to the excitation coil surface with form of truncated cone, and by outer round frontal surface bordered through air gap with the corresponding frontal surface of the carrying magnetoconductive disk. The external side plates are limited: by cylinder which axis coincides with the axis of the shaft, by outer round frontal surface, and by inner circular belt. The rectifiers are assembled on the rear end bell covered by cap.

Disadvantage of the known alternator with claw pole rotor is its reduced current output due to increased magnetic resistance between the exciters of the rotor modules and carried claw poles which is due to the limitation of the overall dimensions resulting in limitation of thickness of the exciters external side plates and reducing of the volume where excitation coil is placed.

Other disadvantage is the difficult exciters cooling due to their screening by the magnetoconductive rings of the carried pole configurations.

Disadvantage is also the increased rotor inertia moment.

SUMMARY OF THE INVENTION

Purpose of the invention is to create brushless alternator with claw pole rotor with increased current output, improved cooling of its exciters and reduced rotor inertia moment.

Invention object is achieved by brushless alternator with claw pole rotor comprising drive shaft supported on front and rear bearings in front and rear end bells whereon outside the front end bell an exhaust fan is assembled. Between the front and rear end bells is fastened housing enveloping fixed stator. The stator consists of stator pack with formed on its inner surface multitude of slots on even distribution wherein more than one phase windings are laid consisting of three or more phases. The phase winding terminals are connected to rectifiers covered by cap. On the drive shaft under the stator surface stationary are fit front rotor module and identical mirror-located towards it rear rotor module. Each of the rotor modules consists of carrying and carried claw pole configurations with claw poles. The carrying configuration of each rotor module includes carrying magnetoconductive disk with even spaced on its periphery claw poles. The carried pole configuration of each rotor module includes even spaced second claw poles connected by magnetoconductive ring. The second claw poles of both rotor modules are connected immovably by corresponding non-magnetic ring with the first claw poles. Each of rotor modules includes exciter in form of reel composed by internal and external side plates connected with cylindrical body forming a groove where excitation coil is placed. The external side plates are connected respectively to the front and rear end bell. The internal side plates are limited: by cylinder which axis coincides with the axis of the shaft, by convex to the excitation coil surface with form of truncated cone, and by outer round frontal surface bordered through air gap with the corresponding frontal surface of the carrying magnetoconductive disk. The rectifiers are assembled on the rear end bell covered by cap.

According to the invention the carrying magnetoconductive disks of the carrying pole configurations with claw poles of both rotor modules are united in a common carrying disk. The external side plates of the exciters are limited: by cylinder which axis coincides with the axis of the shaft, by convex to the excitation coil surface with form of truncated cone, and by outer round frontal surface. The peripheral surface of the ring connecting the second claw poles is which is opposite to the second claw poles is profiled and protruding outwards. This profiled peripheral surface is limited by the adjacent surfaces of inner and outer truncated cones whose axes coincide with the axis of the shaft. The small base of each outer truncated cone is placed respectively against the front and rear end bells and the small base of each of inner truncated cones is oppositely disposed to those of outer truncated cones. Before the intersection of the inner and outer conical surfaces limiting every first magnetoconductive ring, is formed a round face of its profiled peripheral surface. On the peripheries of the external side plates at diameters equal to the inner diameters of the carried pole configurations and axes coinciding with the axis of the shaft stationary are fixed second magnetoconductive rings whose surfaces located on the side of the first magnetoconductive rings are groove-shaped. The shape of this groove corresponds to the shape of the profiled protruded outwards peripheral surface of each of the first magnetoconductive rings. The mentioned groove comprises the profiled protruded outwards peripheral surface of each of the first magnetoconductive rings with the possibility of their free rotation in their respective groove. On the face surface of the rear end bell is shaped a circular belt of vent-holes situated above diode rings, second circular belt of vent-holes situated between diode rings and third circular belt of vent-holes situated under diode rings. Between the front end bell and the second magnetoconductive ring of the exciter is shaped an air-conductive duct. Between the rear end bell and the second magnetoconductive ring is shaped second air-conductive duct. For the stator additional cooling air ducts are foreseen. In the presence of more than one phase windings e1, e2, laid in one and the same slot, to the rectifier is connected wye-center only of the one e2 of these phase windings situated nearest to the slots bottom.

It is possible the additional cooling air ducts to be arranged uniformly over the entire stator periphery. In other version of the invention the additional cooling air ducts are arranged in the corner zones between the outside stator surface and the carrying it front end bell as well as between the stator and the centered on its outside surface rear end bell. These ducts are separated by inner ribs.

Advantage of the brushless alternator with claw poles according to the invention is the increased current output due to reduced magnetic resistance between the exciters and carried claw poles. The magnetic resistance is formed between the overlapping surfaces of the exciters and carried claw poles. By the presence of the second magnetoconductive ring upon the external side plate of the exciter the external side plate thickness on its periphery is reduced and the place for the excitation coil disposition is increased by giving conical shape of the inner surface. At the same time by introducing conical shapes and increase the overlapping surfaces of 2 to 4 and their extending in axial direction the overlapping surfaces were increased more than twice. Moreover the gap preventing the rotating part from touching the immovable part is hypotenuse of rectangular triangle whereas the gap determining the magnetic resistance is cathetus.

Advantage of the brushless alternator with claw poles according to the invention is also the reduced rotor inertia moment by reducing axial size of magneto-conductive rings connecting the claw poles of the carried claw-shaped configuration.

BRIEF DESCRIPTION OF THE DRAWINGS

The invention is illustrated by means of applied figures where.

DETAILED DESCRIPTION OF THE PREFERRED EMBODIMENTS

Figure 1:
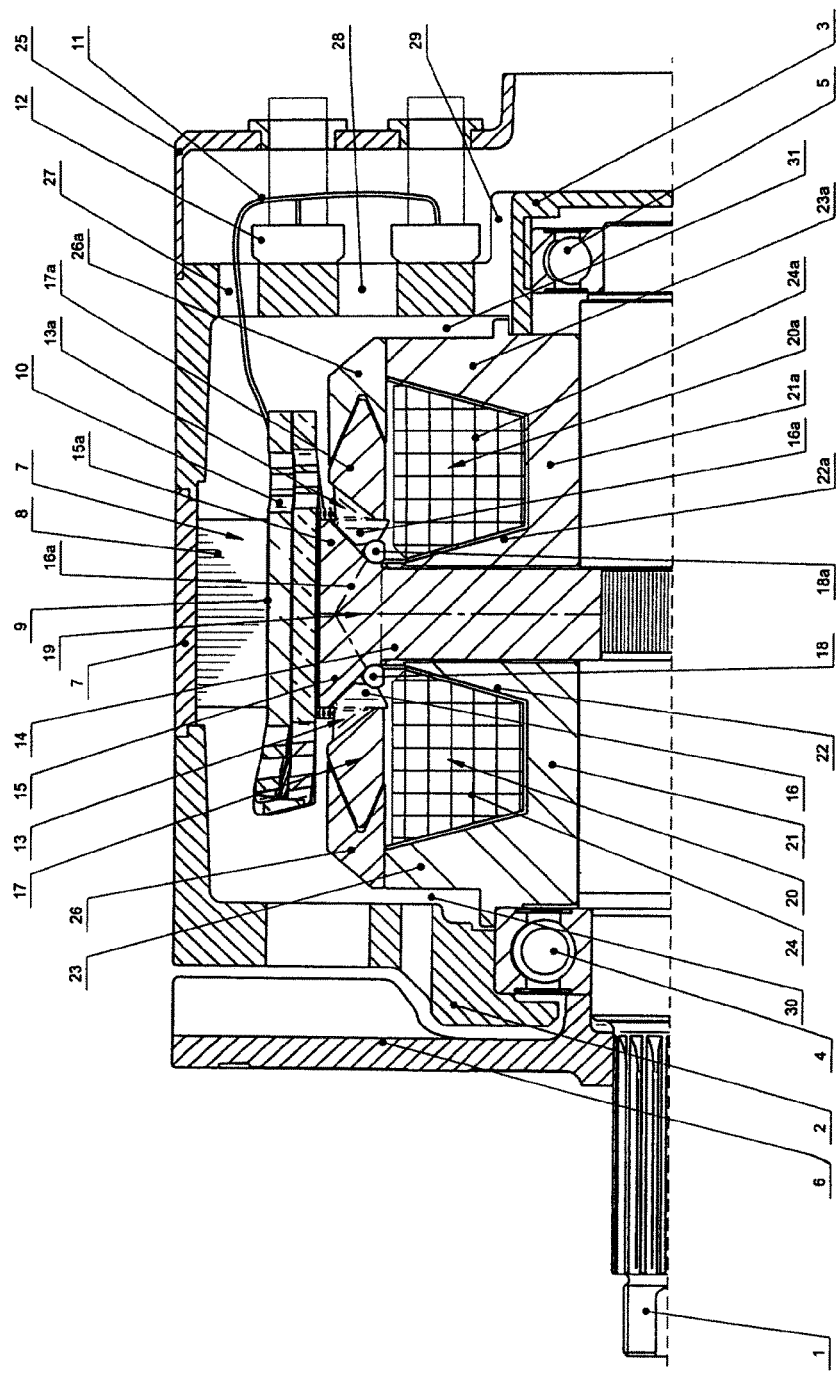
FIG. 1 represents half-section of the brushless alternator with claw poles according to the invention.
Figure 2:
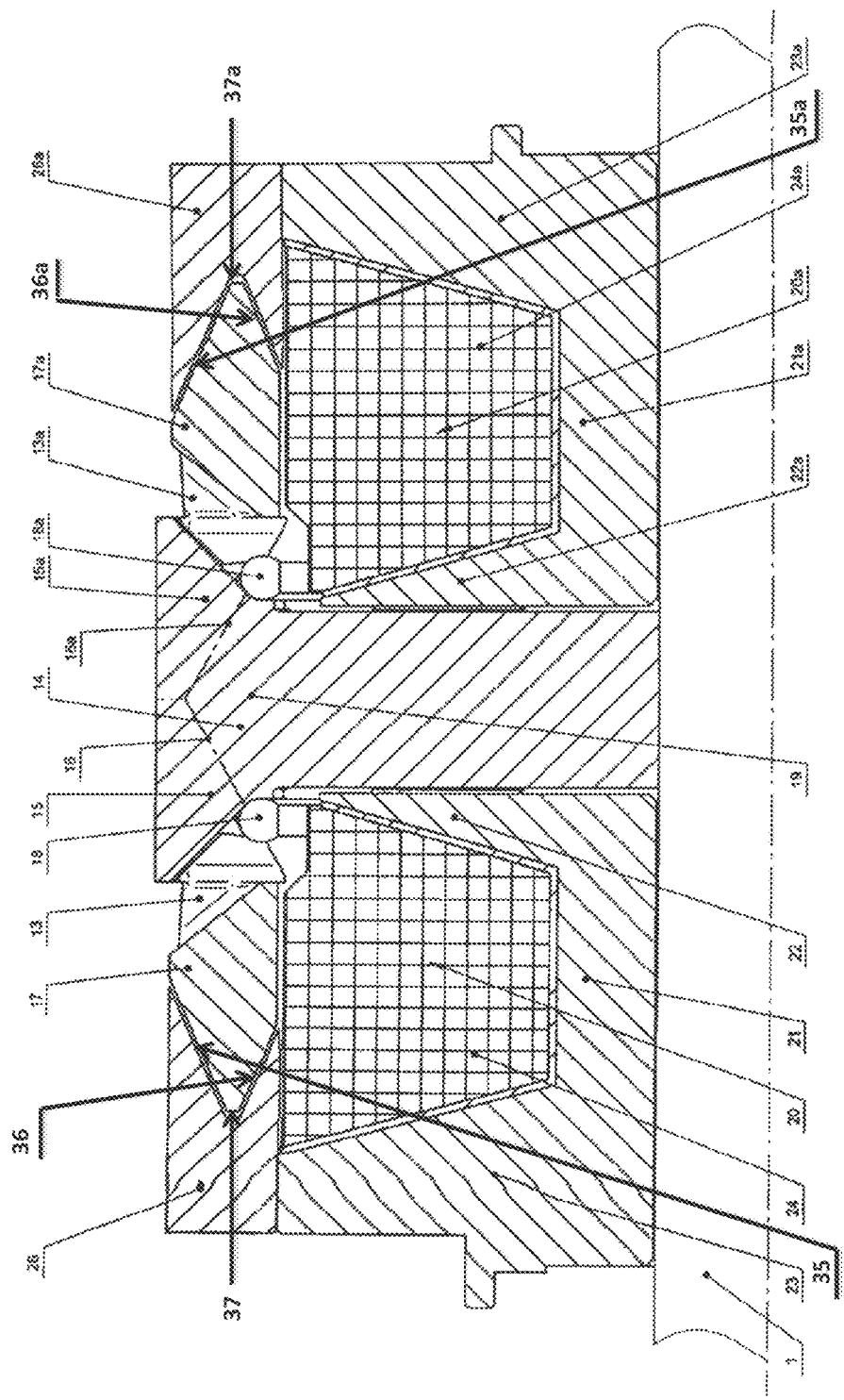
FIG. 2 represents magnified half-section of the rotor of the brushless alternator from FIG. 1.

In an example embodiment of the invention shown on FIG. 1 the brushless alternator with claw pole rotor comprises drive shaft 1 supported in front 2 and rear 3 end bells on front 4 and rear 5 bearings. On the shaft 1 outside the front end bell 2 is assembled exhaust fan 6. Between front 2 and rear 3 end bells housing 7 is fixedly connected, comprising fixedly stator. The stator consists of stator pack 8 with formed on its inner surface multitude of slots 9. In the slots 9 are laid one or more e1, e2 phase windings 10. Each phase winding 10 consists of three or more phases. The terminals 11 including also the terminals of phase windings 10 wye-centers if there are such, are connected to rectifiers 12. On the shaft 1 under the stator 8 inner surface are set firmly two rotor modules—front rotor module 13 and identically mirror-located towards it rear rotor module 13a whose half-section is shown in magnified scale on FIG. 2. Each rotor module 13 and 13a consists of carrying and carried pole configurations.

The carrying pole configuration of the front module 13 comprises carrying magnetoconductive disk 14 with even spaced on its front periphery first claw poles 15. The carried pole configuration of the front module 13 includes second claw poles 16 connected by first magnetoconductive ring 17. The carrying configuration of the rear module 13a comprises the carrying magnetoconductive disk 14 with even spaced on its rear periphery first claw poles 15a. The carried pole configuration of the rear module 13a includes second claw poles 16a connected to first magnetoconductive ring 17a identical to the first magnetoconductive ring 17.

The second claw poles 16 and 16a of both rotor modules 13 and 13a are fixedly connected by appropriate nonmagnetic ring 18 and 18a with the first claw poles 15 and 15a.

The peripheral surface of each of the first magnetoconductive rings 17 and 17a which is opposite to the second claw poles 16 and 16a is profiled and protruded outwards. This peripheral surface is shaped by the adjacent surfaces of inner 36, 36a and outer 35, 35a truncated cones whose axes coincide with the axis of the shaft 1. The small base of each outer 35, 35a truncated cone is disposed respectively against the front 2 and rear 3 end bells. The small base of each of the inner truncated cones 36, 36a is located opposite to that of each of the outer truncated cones 35, 35a. Before intersection of surfaces of inner 36, 36a and outer 35, 35a truncated cones every first magnetoconductive ring 17 and 17a is formed a round face 37, 37a of the profiled peripheral surface.

The carrying pole configuration of the front 13 and rear 13a rotor module form common carrying pole configuration 19 because of that the carrying magnetoconductive disk 14 is common to both rotor modules 13 and 13a.

The pole configuration of the front rotor module 13 comprises exciter 20, and the pole configuration of the rear rotor module 13a comprises exciter 20a mirror-located to exciter 20. The exciters 20 and 20a are in the shape of reel each of which is composed of cylindrical body 21 and 21a both ends of which are connected to the internal 22, 22a and external 23, 23a side plates forming grooves where excitation coils 24, 24a are winded up.

The internal side plates 22, 22a are limited: by cylinder which axis coincides with the axis of the shaft 1, by convex to the excitation coils 24, 24a surface with form of truncated cone, and by outer round frontal surface bordered through air gap with the corresponding frontal surface of the carrying magnetoconductive disk 14. The external side plates 23 and 23a of the exciters 20 and 20a are also limited by cylinder which axis coincides with the axis of the shaft 1, by convex to the excitation coils 24, 24a surface with form of truncated cone, and by outer round frontal surface. The exciters 20 and 20a are attached stationary respectively to the front end bell 2 and the rear end bell 3 by relevant external side plates 23 and 23a.

The rectifier's block 12 is covered by rear cap 25 mounted on the rear end bell 3.

On the peripheries of the external side plates 23 and 23a at diameters equal to the inner diameters of the carried pole configurations and with axes coinciding with the axis of rotation of the brushless alternator stationary are fixed second magnetoconductive rings 26 and 26a.

The peripheral surface of each of the second magnetoconductive rings 26, 26a from the side of the first magnetoconductive rings 17, 17a is formed as a groove whose shape corresponds to the shape of the profiled protruded outwards peripheral surface of each from the first magnetoconductive rings 17, 17a. This groove comprises the protruded outwards peripheral surface of each of the first magnetoconductive rings 17, 17a with the possibility of their free rotation in it.

On the face surface of the rear end bell 3 is shaped a circular belt of vent-holes 27 situated above diode rings, second circular belt of vent-holes 28 situated between diode rings and third circular belt of vent-holes 29 situated under diode rings.

Between the front end bell 2 and the second magnetoconductive ring 26 of the exciter 20 is shaped an air-conductive duct 30. Between the rear end bell 3 and the second magnetoconductive ring 26 is shaped second air-conductive duct 31.

Figure 3:
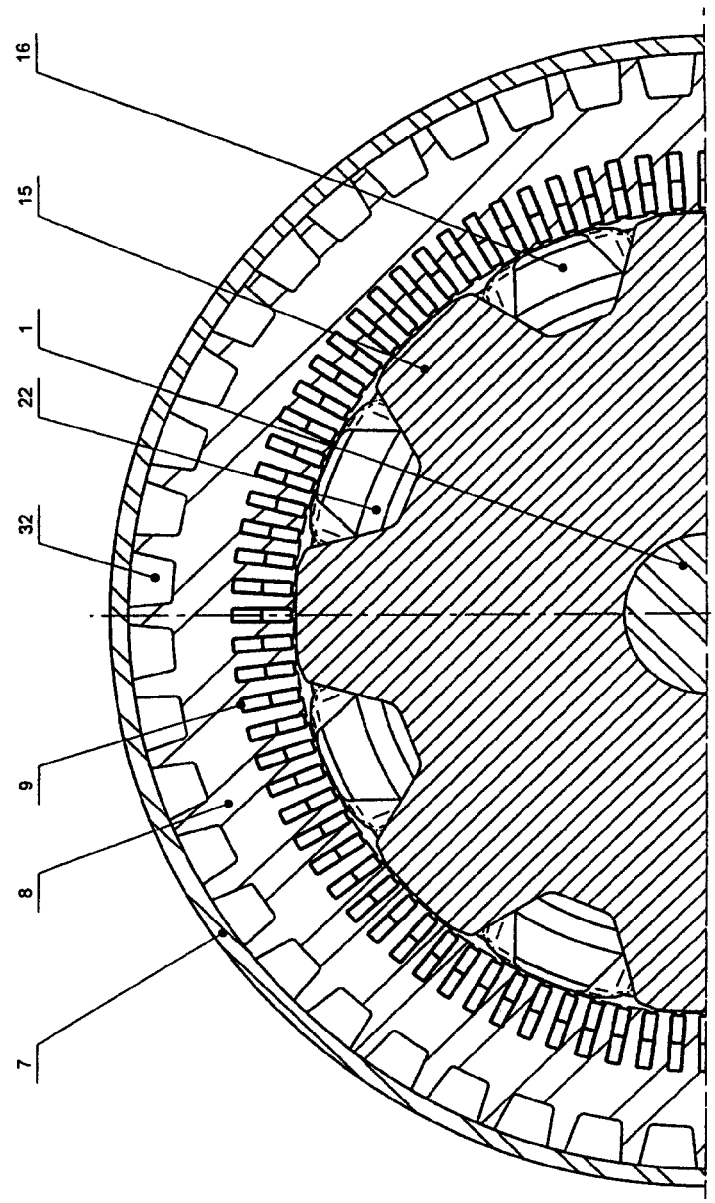
FIG. 3 represents half cross-section of the brushless alternator with claw poles made by housing fixed to stator and to front and rear end bells.

Between housing 7 and stator 8 over the entire stator periphery are shaped ducts 32 for passing of cooling air as shown on FIG. 3.

Figure 4:
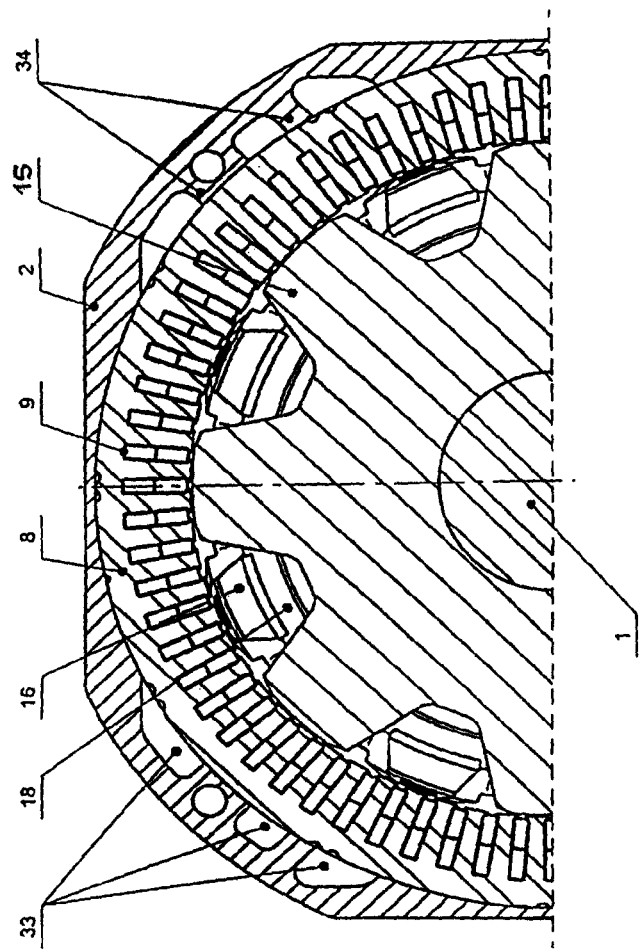
FIG. 4 represents half cross-section of the brushless alternator with claw poles made by housing shaped as a part of the front end bell.

When the front end bell is formed integrally with the housing 7 between the outer surface of the stator 8 and carrying it front end bell 2, as well as between the stator 8 and the centered on its outer surface rear end bell 3 in the corner zones are shaped air ducts 33 as shown on FIG. 4. The ducts 33 are separated by inner ribs 34.

Figure 5:
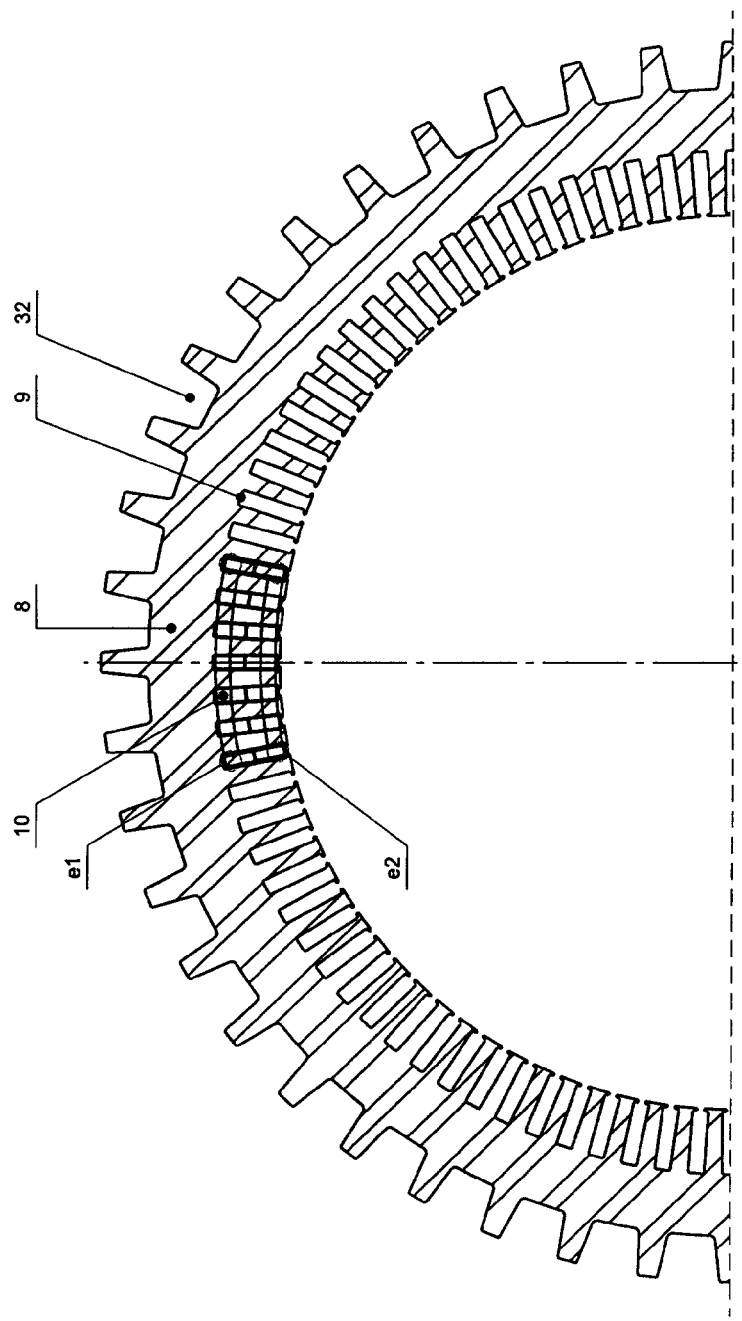
FIG. 5 represents a section through the slots formed on the stator inner surface with laid there more than one phase windings.

FIG. 5 shows the arrangement of one or more e1, e2 phase windings 10, laid in one and the same slot 9. To the rectifiers 12 are connected windings e2 situated at the bottom of slots 9.

Working of Alternator with Clow Poles According to the Invention

After bringing the alternator into rotation and current supplying of the excitation coils 24, 24a magnetic fluxes are created passing over the exciters 20, 20a, second claw poles 16, 16a and stator 8, as a result of which in the windings 10 induces electromotive force and through windings 10 current begins to flow. Magnetic fluxes are with raised values so that the current output is increased due to the reduced magnetic resistance between the external side plates 23 and 23a and the first magnetoconductive rings 17, 17a and the second magnetoconductive ring 26, 26a. The magnetomotive force generated by the excitation coils 24, 24a is increased due to increased number of turns of the excitation coils 24, 24a in the increased space wherein they are located owing to conical shape of the inner surfaces of the external side plates 23, 23a of the exciters 20, 20a. In heating condition the temperature of the excitation coils 24, 24a is reduced and their current and generated magnetomotive force are reduced to a smaller value as compared with the known alternator due to improved cooling of the exciters 20, 20a through the increased open surfaces of the external side plates 23, 23a as well as the increased amount of the cooling air through the three belts vent-holes 27, 28 and 29 in the rear end bell 3. Heat amount passing from the exciters 20, 20a to the bearings 4 and 5 is also reduced.

Experimental Results Received by Sample Investigation Realising the Invention

The inventor has made a sample of bi-modal alternator according to the invention that compared with existing alternator in the same size is with increased output current from 520 A up to 650 A and reduced starting speed of rotation from 1180 to 1100 $min^{-1}$. Rotor inertia moment is reduced by 10%.

REFERENCE

1. PATENT DOCUMENTS U.S. Pat. No. 7,915,783 B2, Mar. 29, 2011

The invention claimed is:
1. A brushless alternator with claw pole rotor, comprising:
 a) a front end bell and a rear end bell;
 b) a drive shaft supported on bearings in the front end bell and the rear end bell;
 c) a carrying magnetoconductive disk mounted on the drive shaft, having a front periphery and a rear periphery;
 d) a front rotor module mounted on the drive shaft, comprising:
  i) a front carrying pole configuration comprising a plurality of evenly spaced first front claw poles on the front periphery of the carrying magnetoconductive disk;
  ii) a front carried pole configuration comprising:
   A) a first rotating magnetoconductive ring having an external peripheral surface with a profile in the form of a truncated cone with a larger base and a smaller base, the smaller base being closer to the front end bell and with an axis coinciding with the axis of the drive shaft and an internal peripheral surface with a profile of a truncated cone with a larger base and a smaller base, the larger base closer to the front end bell and with an axis coinciding with the axis of the drive shaft;
   B) a plurality of second front claw poles united with the first rotating magnetoconductive ring;
  iii) a non-magnetic ring connecting the plurality of second front claw poles of the carried pole configuration to the plurality of first front claw poles of the carrying pole configuration;
  iv) an exciter in the form of a reel mounted to the front end bell, comprising:
   A) a cylindrical body having an internal side plate adjacent to the carrying magnetoconductive disk, an external side plate adjacent to the front end bell; and a groove formed between the internal side plate and the external side plate;
   B) an excitation coil in the groove;
  v) a first immovable magnetoconductive ring mounted to the external side plate of the cylindrical body and overlapping a part of the excitation coil, having a face surface shaped so, as to surround the truncated cones of the external and the internal peripheral surfaces of the first rotating magnetoconductive ring;
 e) a rear rotor module mounted on the drive shaft mirror-located to the front rotor module, comprising:
  i) a carrying pole configuration comprising a plurality of evenly spaced first rear claw poles on the rear periphery of the carrying magnetoconductive disk;
  ii) a carried pole configuration comprising:
   A) a second rotating magnetoconductive ring, having an external peripheral surface with a profile in the form of a truncated cone with a larger base and a smaller base, the smaller base being closer to the rear end bell and with an axis coinciding with the axis of the drive shaft and an internal peripheral surface with a profile in the form of a truncated cone with a larger base and a smaller base; the larger base being closer to the rear end bell, and with an axis, coinciding with the axis of the drive shaft;

B) a plurality of second claw poles united with the first magnetoconductive ring;

iii) a non-magnetic ring connecting the plurality of the second rear claw poles of the carried pole configuration to the plurality of first rear claw poles of the carrying pole configuration;

iv) an exciter in the form of a reel mounted to the rear end bell, comprising:

A) a cylindrical body having an internal side plate adjacent to the carrying magnetoconductive disk, an external side plate adjacent to the rear end bell, and a groove formed between the internal side plate and the external side plate;

B) an excitation coil in the groove;

v) a second immovable magnetoconductive ring mounted to the external side plate of the cylindrical body and overlapping a part of the excitation coil, having a face surface shaped so, as to surround the truncated cones of the external and the internal peripheral surfaces of the second rotating magnetoconductive ring;

f) a stator surrounding the front rotor module and the rear rotor module, comprising:
   i) a stator pack having an inner surface;
   ii) a plurality of slots evenly distributed on the inner surface of the stator pack;
   iii) at least one phase winding laid in the plurality of slots, each phase winding comprising at least three phases; and g) rectifiers mounted on the rear end bell electrically coupled to the phases of the windings.

2. The brushless alternator of claim 1, further comprising cooling air ducts arranged over a periphery of the stator connecting the spaces enclosed by front and rear end bells.

3. The brushless alternator of claim 1, further comprising cooling air ducts connecting the spaces enclosed by front and rear end bells arranged in the corner zone between the outside surface of the stator and the front end bell and between the outside surface of the stator and the rear end bell.

* * * * *